No. 607,354. Patented July 12, 1898.
L. F. EAST.
JUG LID.
(Application filed Sept. 30, 1897.)
(No Model.)
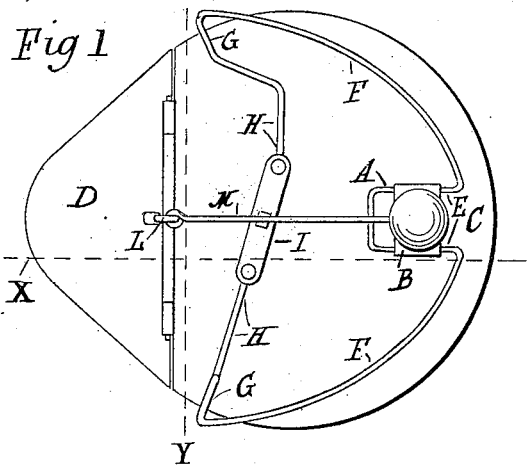
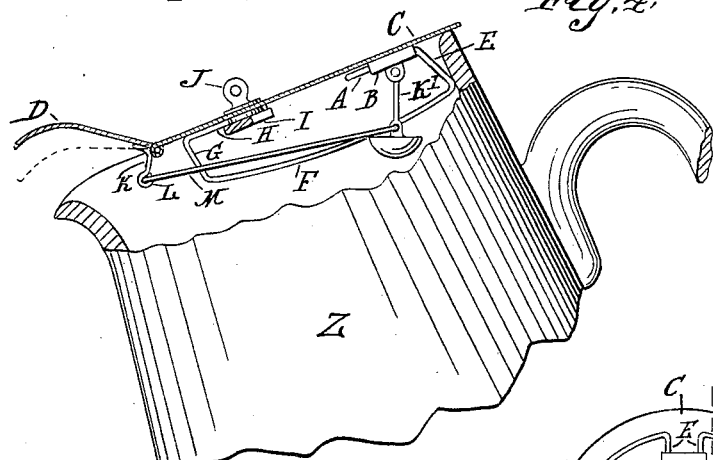
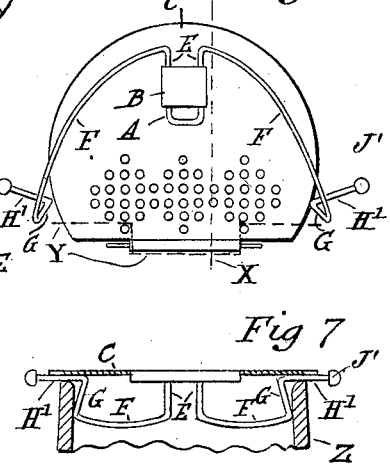
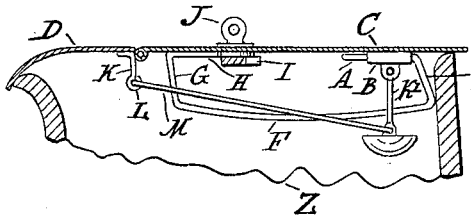
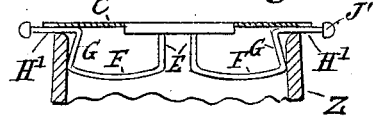
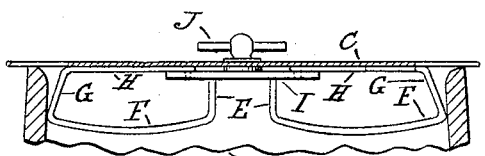
Witnesses:
Inventor:
Lewis Findlay East

UNITED STATES PATENT OFFICE.

LEWIS FINDLAY EAST, OF MELBOURNE, VICTORIA.

JUG-LID.

SPECIFICATION forming part of Letters Patent No. 607,354, dated July 12, 1898.

Application filed September 30, 1897. Serial No. 653,634. (No model.)

*To all whom it may concern:*

Be it known that I, LEWIS FINDLAY EAST, civil servant, a subject of the Queen of the United Kingdom of Great Britain and Ireland, residing at Melbourne, in the county of Bourke, in the Colony of Victoria, have invented certain new and useful Improvements in Jug-Lids; and I do hereby declare that the following is a full, clear, and exact description thereof, which will enable others skilled in the art to which it appertains to make and use the same.

Claret, hot water, milk, and other fluids being best kept covered, jugs and other vessels therefor have been provided with covers (sometimes perforated) which for greater convenience of cleansing and use have been made easily removable and replaceable and which have had hinged thereto a lip adapted to open automatically upon the vessel being tilted.

My improvements relate to covers of the above class.

My improved cover can be readily attached to and detached from jugs (and the like) of different diameters, and the lip will, when the jug is tilted, open automatically. This opening is not effected by means of a counterpoise or balance weight, which would simply cause the lip to remain horizontal; but by means of a device which causes the lip to rise above the horizontal when tilting of the jug occurs. When the jug is very full and in some other cases, an aperture sufficiently large for the unimpeded exit of the fluid is not gained by the use of a simple counterpoise.

My cover is made of any suitable material and size and is shown in the accompanying drawings, in which—

Figures 1 to 4 exhibit one form of my invention, and Figs. 5 to 7 a modification on a smaller scale, the latter views omitting the hinged lip at the front of the cover and the device for causing the lip to open automatically. Figs. 1 and 5 each show a plan from beneath; Figs. 2 and 6, side elevations in section on the line X in Figs. 1 and 5, respectively. Figs. 3 and 7 show in each case a cross-section on the line Y in Figs. 1 and 5, respectively, and Fig. 4 shows the position of the parts in Fig. 2 when the jug is tilted.

I use a spring, preferably of bent wire, which is cheap and durable, the rear part A being slipped removably (to allow of cleansing and replacement or substitution of another spring) into a sleeve or socket B, which is fixed to the under side of the rear part C of the cover, which has at its front part any hinged lip D. From the sleeve each member of the spring has a downward rearward extension E to meet the jug Z, and each then extends with a forward curve F, adapted to contact with the inner wall of the jug over more than half its circumference. The parts F form the body of the spring. From the fore end of each curve F the spring has an upward extension G to some position in which its ends can be pressed or drawn together, so as to enable the spring to be contracted with ease to make it enter and securely fit or to withdraw it from a jug without having to handle or damage the body of the spring. This can be effected in various ways. The simplest and cheapest way is shown in Figs. 5 to 7, and Figs. 1 to 4 show a modification. In the latter the spring ends H are carried inwardly and removably joined to the respective ends of a centrally-pivoted plate I, actuated by a knob or handle J on the outside of the cover. Plate I on being partly rotated contracts the spring. In the simpler form, Figs. 5 to 7, the spring ends H' are carried outwardly to handles or knobs J', and the same compressive action is put on the spring. If a tight-fitting lid is wanted, there can be a depression in the lid to receive each wire where it crosses the edge of the jug.

Referring to the lip D, a short downwardly-projecting shank K, having an eye or the like, L, is rigidly attached to said lip, and to this eye is connected one end of a link M, which has its other end connected to a shank K', pivoted or hung to the rear of C. The base of the shank K' is weighted, and the length of the shank K above link M is less than that of K' above the said link. In consequence of the weight, shank K' will tend to remain vertical, however the jug is tilted. This tendency so affects link M and shank K as to raise the lip above its horizontal or normal position, (dotted in Fig. 3.) This effect is due to the fact that an arc on the radius of shank K of equal length to an arc on the radius of shank K' contains a greater angle. The shorter the shank K is the greater will be the clearance between it and the liquid issuing from the jug when tilted.

Having now described my invention, I claim—

1. In a cover of the class described, the combination with a socket under one edge of the cover; a bent spring mounted in said socket and having branching arms extending therefrom downward and backward to meet the vessel, thence forward and outward to press against the vessel at each side; thence upward to the cover; and means for compressing the ends of said spring toward each other from the exterior of the cover, substantially as described.

2. In a cover of the class described, the combination with a socket under one edge of the cover; a bent spring mounted in said socket and having branching arms extending therefrom downward and outward to meet the vessel, thence forward and outward to press against the vessel at each side; thence upward to the cover; and thence outwardly, beyond the edges of the said cover in position to be compressed by the hand, substantially as described.

3. The combination with a cover of the class described, of a lip hinged thereto; a weighted shank hung to the rear part thereof; a shank fixed to said hinged lip; and a link connecting the bases of said shanks, substantially as described.

4. In a cover of the class described, the combination with the cover proper; of a lip hinged thereto; a shank fixed to the under side of said hinged lip; a swinging weight suspended from said cover; a stiff connection between said weight and the said shank on said lip; a branching spring fixed to the under side of said cover; and connections on the exterior of said cover by means of which said spring may be compressed to release said cover from the vessel, substantially as described.

5. The combination with a removable cover of the character described, of a branching spring fixed to the under side of said cover, and adapted to take against the sides of the interior of the vessel, when extended; and connections upon the exterior of said cover, by means of which said spring may be compressed and released, substantially as described.

In witness whereof I have hereunto set my hand in presence of two witnesses.

LEWIS FINDLAY EAST.

Witnesses:
G. G. TURRI,
E. F. NICHOLLS.